Dec. 24, 1957 F. K. KNOHL 2,817,380
RESILIENT UNDULATING LOCK WASHER WITH INCLINED
LUGS FOR RETAINING ON ROTARY FASTENER
Filed Jan. 11, 1954
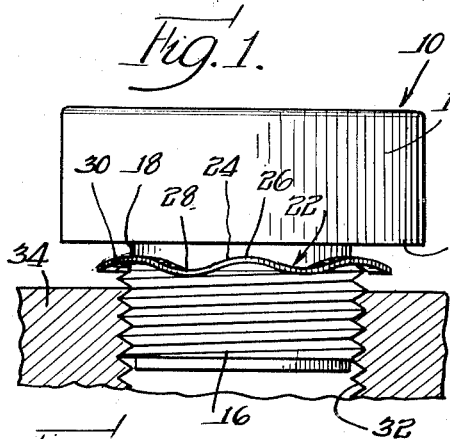
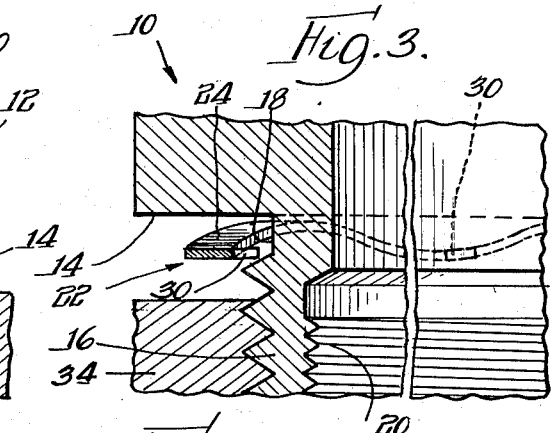
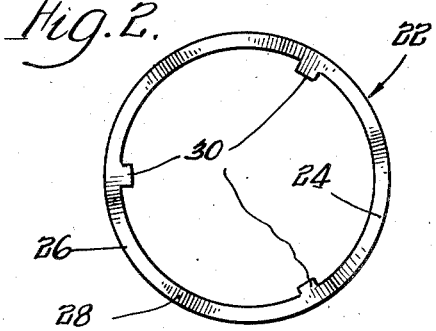
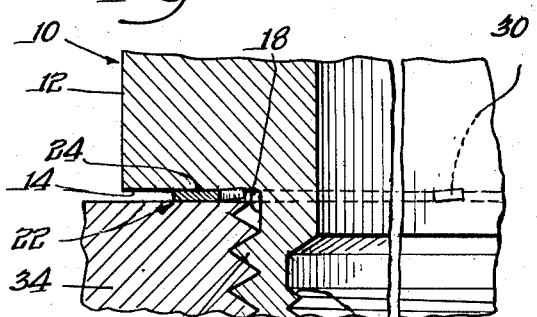
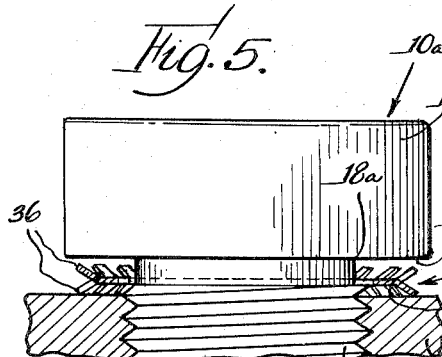
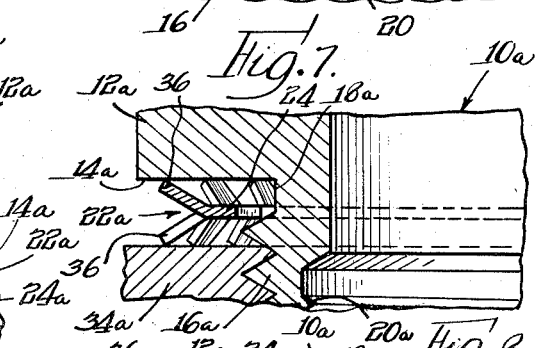
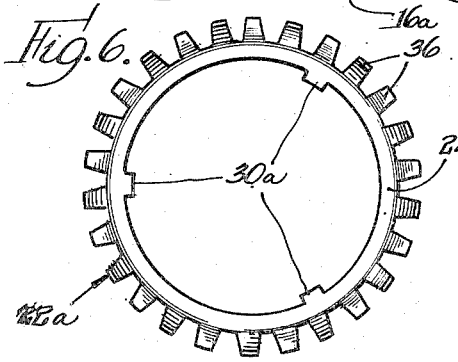
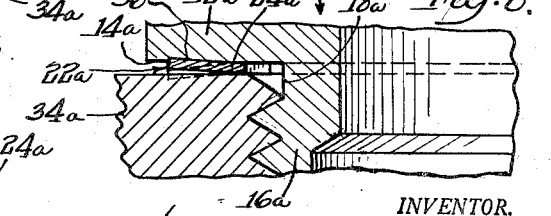
INVENTOR.
Friedrich Karl Knohl
BY
Olson & Trexler
attys.

United States Patent Office 2,817,380
Patented Dec. 24, 1957

2,817,380

RESILIENT UNDULATING LOCK WASHER WITH INCLINED LUGS FOR RETAINING ON ROTARY FASTENER

Friedrich Karl Knohl, Chicago, Ill., assignor to Illinois Tool Works, Chicago, Ill., a corporation of Illinois Application January 11, 1954, Serial No. 403,134

1 Claim. (Cl. 151—38)

This invention is concerned with a lock washer and with a preassembled unit comprising a threaded fastener and a lock washer.

Lock washers for preventing accidental loosening or retraction of threaded fasteners have been in use for a great number of years and are well known in the art. To avoid the handling of too many parts, preassembled lock washers and threaded fasteners have been developed. In the case of screws and other threaded stud fasteners it has been found preferable to telescopically associate a fastener blank and lock washer, and then to roll threads on the shank. Such thread rolling enlarges the maximum shank diameter sufficiently to trap the washer above the threads and beneath a head or the like on the fastener.

In spite of the great progress made in producing preassembled threaded fasteners and lock washers, the preassembled units found in the prior art have not been completely successful in very large sizes. This is particularly true in the case of threaded stud fasteners wherein the diameter is greater than the length of the stud. It is difficult or impossible to roll threads on such studs, particularly in the case of hollow studs.

It is accordingly an object of this invention to provide a washer for preassembly with large diameter threaded stud fasteners, particularly those wherein the stud diameter is greater than the stud length, and it further is an object of this invention to provide a presassembled fastener unit comprising such a washer and threaded stud fastener.

Another object of this invention is to provide a lock washer adapted to be threaded on to a large diameter threaded stud fastener which will not readily become unthreaded therefrom.

More specifically, it is an object of this invention to provide a spring lock washer the body of which is temporarily deformed slightly in threading on to a threaded stud.

A further object of this invention is to provide a lock washer of the foregoing character providing frictional spring locking means when the washer is clamped in work holding position.

Yet another object of this invention is to provide a washer of the foregoing character which can be threaded on to a threaded stud with the washer oriented in either of the two possible positions of axial alignment with the stud.

Other and further objects and advantages of the present invention will be apparent from the following description when taken in connection with the accompanying drawings wherein:

Fig. 1 is a side elevation of a threaded stud and washer constructed in accordance with the principles of my invention;

Fig. 2 is a plan view of the washer;

Fig. 3 is a fragmentary sectional view on an enlarged scale showing the stud and washer before clamping of the washer in work holding position;

Fig. 4 is a view similar to Fig. 3 showing the washer clamped in work holding position;

Fig. 5 is a view similar to Fig. 1 showing a modified form of washer;

Fig. 6 is a plan view of the washer shown in Fig. 5;

Fig. 7 is an enlarged fragmentary sectional view of the washer and stud before clamping of the washer in work holding position; and Fig. 8 is a view similar to Fig. 7 showing the washer clamped in work holding position.

Referring first to Figs. 1–4 wherein the preferred embodiment of the invention is shown, there will be seen a threaded stud fastener 10 having a head 12 of any desired configuration and having a clamping face 14. A threaded shank 16 extends axially from the head 12 and is provided with a threadless portion 18 immediately adjacent the clamping face 14. The shank may be on the same order of size as indicated in the drawings, or even larger, and the shank diameter generally is greater than the length of the shank. The shank is illustrated as being hollow, having internal threads as indicated at 20 for cooperation with a threaded male fastener or member.

A washer 22 is provided for telescopic association with the threaded stud fastener 10 and comprises a continuous spring ring or body 24 of undulating or wavy configuration having successive crests 26 and valleys 28. The washer is provided with three equally arcuately spaced ears, tabs or lugs 30 projecting radially inwardly from the ring 24. Each lug 30 is flat or coplanar with the adjacent portion of the ring, and the lugs preferably are displaced slightly from adjacent crests (or valleys, depending upon the orientation of the washer) so that the lugs will be inclined slightly toward a left-hand thread or pitch. As will be observed in the illustrative example of the washer, there are six crests and corresponding valleys and three lugs 30. As a result, each lug is similarly oriented relative to the adjacent crest and valley.

The radial length of the lugs 30 is less than the arcuate width, and accordingly the lugs are most unlikely to twist within their own lengths. Accordingly, when the lugs are threaded on to the threaded shanks 16 of the fastener 10, it being remembered that the lugs have a somewhat left-hand or reverse thread or pitch, the lugs twist or deform the adjacent portion of the washer body or ring 24 in order that the lugs may conform to the pitch of the threads on the fastener shank. The diameter of the circle circumscribed by the inner ends of the lugs 30 is less than the major diameter of the threaded shank 16 and only slightly greater than the minor diameter for accurate interfitting with the threads, while the inner diameter of the ring or body 24 is just slightly greater than the major diameter of the threaded shank for fitting thereover. The washer is made of resilient or spring material such as steel or other suitable material, and when the lugs 30 reach the unthreaded portion 18 of the fastener shank, the body springs back to its original shape and returns the lugs 30 to the left-hand or reverse pitch so that they will not readily engage with the threads by accident for inadvertent retrograde movement from the fastener. Since the lugs 30 are displaced slightly from the crests and valleys, they lie intermediate extreme planes defined by the crests and by the valleys, and since the unthreaded portion 18 is provided on the shanks above the threads, the washer can be threaded on to the stud shank with either face of the washer confronting the clamping face 14 of the stud head. The undulation of the washer may be observed in Figs. 1 and 3 as the stud is being threaded into a threaded aperture 32 in a work piece 34. When the stud reaches fully seated position, the clamping face 14 thereof substantially flattens the body or ring 24 of the washer 22 as shown in Fig. 4. The spring characteristic of the washer tends to restore the body to its original undulating configuration, and thereby causes frictional gripping of the clamping face 14 of the fastener and the surface of the work piece 34 to resist unauthorized reverse rotation of the fastener.

It will be apparent from the foregoing description that the fastener unit comprising the threaded stud fastener and the washer comprises a utilitarian article of manufacture, and that the washer itself is useful for association with studs somewhat similar to that described.

A modified washer is shown in Figs. 5–8. The fastener therein is substantially identical with that previously disclosed, and the washer has many of the characteristics of the washer previously disclosed. Accordingly, similar parts are identified by similar numerals with the addition of the suffix a. The threaded fastener 10a is similar to the previously described fastener including a head 12a having a clamping face 14a and a threaded shank 16a. The shank has an unthreaded portion 18a directly beneath the clamping face and preferably is hollow, having internal threads as indicated at 20a.

The washer 22a comprises a ring or body portion 24a which is flat or planar. The internal diameter of the body 24a is sufficient to fit over the threaded shank 16a, and is provided with a plurality of equally arcuately spaced, inwardly projecting lugs 30a. These lugs lie in the plane of the body 24a and are short and wide so that they will not twist within their own lengths but rather will deform the body in the vicinity of the lugs as they are threaded on the threaded shank 16a of the fastener, it being understood that the diameter of the circle circumscribed by the inner ends of the lugs is slightly greater than the minor diameter of the threaded shank 16a and substantially less than the larger diameter thereof. The washer 22a further is provided with equally arcuately spaced apart teeth 36 projecting radially from the ring or body 24a. Alternate teeth are deflected in opposite directions from the plane of the body, but the teeth are not twisted about their radial axes. The teeth are flattened out from their normally deflected position shown in Figs. 5 and 7 to the flattened position shown in Fig. 8 between the clamping face 14a and the surface of the work piece 34a into which the stud is threaded when the threaded stud reaches fully seated position. The washer is made of the same spring material as in the previous embodiment, and the teeth therefore tend to spring back to their normally deflected position, thereby frictionally locking fasteners of relatively hard material, and actually biting into fasteners of relatively soft material such as aluminum, whereby to resist unauthorized reverse rotation.

It will be apparent that the washer 22a is symmetrical about the plane of the ring or body and therefore can be assembled with a threaded stud fastener with either face of the washer confronting the clamping face of the fastener.

In both embodiments of the invention, it will be observed that the fastener and washer have utility as a preassembled fastener unit, and that the washer has separate utility for assembly with other somewhat similar threaded studs. In both embodiments of the invention, the lugs 30a are not normally pitched for threading on to a stud, in one embodiment being flat or planar, and in the other embodiment being reversely pitched. The rigidity of the lugs, coupled with the lack of pitch corresponding with that of a threaded stud, causes the washer body to be deflected, deformed, or distorted in the vicinity of the lugs when the washer is threaded on to the stud. The resiliency of the washers returns the lugs to their normal position after the washers have been threaded completely into place, and this normal position of the lugs is such that they will not readily engage with the stud threads by accident for inadvertent unthreading. Therefor, the threaded stud and washer remain as a preassembled fastener unit.

Both of the washers have portions projecting above and below the plane formed by the lugs, and accordingly can be installed on the threaded stud with either face of the washer confronting the clamping face of the threaded stud fastener. Whichever way the washer is installed, it cooperates with the work piece and the clamping face and threaded stud fastener in the same manner.

The particular embodiments of the invention herein shown and described are for illustrative purposes only. Structural changes doubtless will occur to those skilled in the art, and will be understood as constituting a part of my invention insofar as they fall within the spirit and scope of the appended claim.

I claim:

A fastener unit comprising the combination of a threaded fastener and a washer, said threaded fastener comprising a relatively large diameter shank, means providing a clamping face encircling said shank and substantially perpendicular thereto, said shank including a first portion having a smooth surface of pre-determined diameter adjacent said clamping face, and a second portion including screw threads having an outside diameter greater than said first mentioned pre-determined diameter, said washer comprising a resilient annular body having a narrow radial dimension which is much less than the greatest diameter of said shank whereby said annular body is readily temporarily deformed, said annular body having locking sections consisting of undulations projecting above and below a median plane through said body and perpendicular to the axis of said washer and progressing circumferentially about said body, and a plurality of lugs projecting substantially radially inwardly from said annuar body and adjacent the threadless portion of said shank which are disposed at angles to the aforesaid median plane oppositely from an angle at which the screw threads are disposed with respect to said median plane, said lugs having an inner diameter less than said outer diameter of the screw threads on said shank and less than the diameter of said smooth shank portion whereby said washer is trapped between the screw threads and clamping face of said fastener, each of said lugs being substantially coplanar with the immediately adjacent portion of said body and thereby lacking coincidence with the screw threads on said shank whereby to resist accidental threading of said washer from said shank, the inner ends of said lugs each having a total arcuate length which is substantially less than any of the spaces between said lugs, the short arcuate length of the lugs and the short radial dimension of the body coacting to produce temporary deformation of said body for conformation of said lugs with the threads on said shank for assembling said washer with said threaded fastener.

References Cited in the file of this patent

UNITED STATES PATENTS

| | | |
|---|---|---|
| 179,931 | Loomis | July 18, 1876 |
| 1,547,162 | Bohlman | July 28, 1925 |
| 2,250,050 | Olson | July 22, 1941 |
| 2,257,959 | Hoppenstand | Oct. 7, 1941 |
| 2,537,575 | Crowther | Jan. 9, 1951 |
| 2,672,069 | Mitchell | Mar. 16, 1954 |

FOREIGN PATENTS

| | | |
|---|---|---|
| 1,006,927 | France | Jan. 30, 1952 |